Feb. 12, 1924.

R. W. STEWART

STOP FOR TALKING MACHINES

Filed June 21, 1922

Richard W Stewart INVENTOR

BY

ATTORNEY

WITNESSES

Feb. 12, 1924.

R. W. STEWART 1,483,753

STOP FOR TALKING MACHINES

Filed June 21, 1922  4 Sheets-Sheet 2

Richard W. Stewart INVENTOR

BY Victor J. Evans ATTORNEY

WITNESSES

Feb. 12, 1924.
R. W. STEWART
1,483,753
STOP FOR TALKING MACHINES
Filed June 21, 1922
4 Sheets-Sheet 3
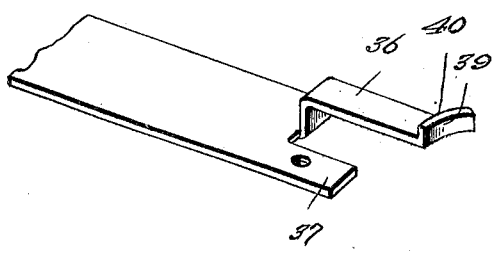
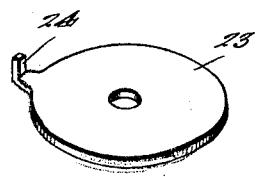
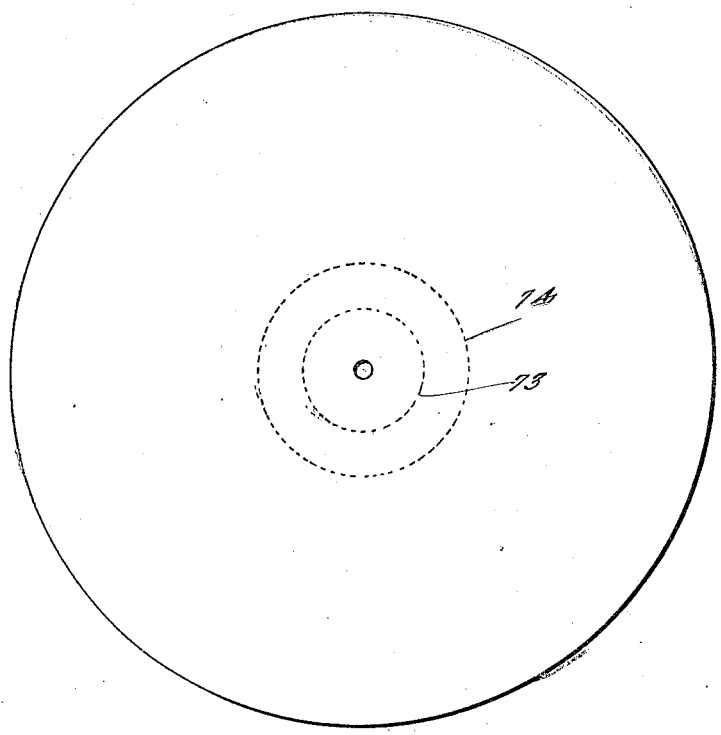
Richard W. Stewart INVENTOR Feb. 12, 1924.                                                  1,483,753
              R. W. STEWART
            STOP FOR TALKING MACHINES
              Filed June 21, 1922        4 Sheets-Sheet 4
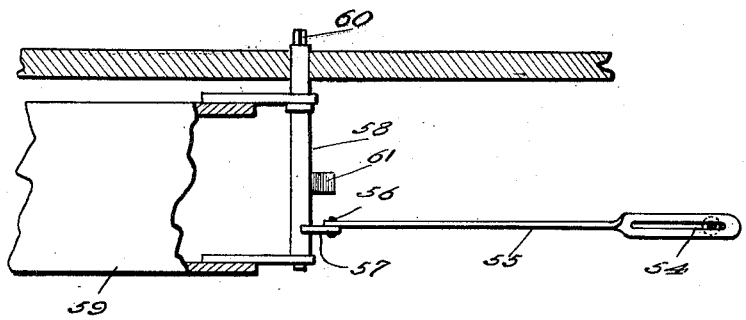
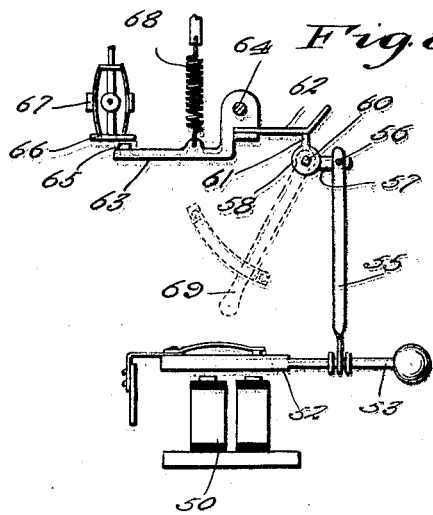
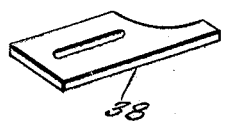
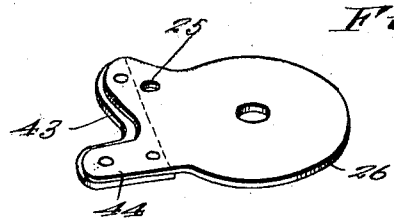
                              Richard W. Stewart
                                            INVENTOR
                              BY Victor J. Evans
WITNESSES                                   ATTORNEY Patented Feb. 12, 1924.

1,483,753

UNITED STATES PATENT OFFICE.

RICHARD W. STEWART, OF AUBURN, NEW YORK.

STOP FOR TALKING MACHINES.

Application filed June 21, 1922. Serial No. 569,858.

*To all whom it may concern:*

Be it known that I, RICHARD W. STEWART, a citizen of the United States, residing at Auburn, in the county of Cayuga and State of New York, have invented new and useful Improvements in Stops for Talking Machines, of which the following is a specification.

This invention relates to improvements in stops for talking machines and has for an object the provision of means for automatically stopping the operation of a talking machine at the end of a selection.

Another object of the invention is the provision of a stop mechanism for this purpose, which is controlled by the action of the needle, or the inward movement of the tone arm, whereby, when the end of a selection is reached and the inward travel of the tone arm ceases, the stop mechanism will automatically operate to stop the operation of the motor of the talking machine.

Another object is the provision of a stop mechanism of the above character, which eliminates the necessity of manually setting or adjusting the same to each individual record, yet will accurately operate to stop operation of a talking machine, irrespective of the size of a record.

Another object of the invention is the provision of a device of this character which is simple of construction, positive and reliable in operation and which is especially designed for use with phonographs of the disc type.

With the above and other objects in view, the invention further includes the following novel features and details of construction, to be hereinafter more fully described, illustrated in the accompanying drawings and pointed out in the appended claims.

In the drawings:—

Figure 4 is a detail perspective view of the outer end of the arm shown in Figure 3.

Figure 5 is a similar view of the adjustable trip carried by the connecting arm.

Figure 6 is a detail perspective view of the friction plate which is engaged by the operating lever.

Figure 7 is a similar view of the intermediate friction plate.

Figure 8 is an enlarged fragmentary view of the brake arm operating mechanism.

Figure 9 is a view at right angles to Figure 8.

Figure 10 is a diagrammatic view of a disc record.

Figure 1:
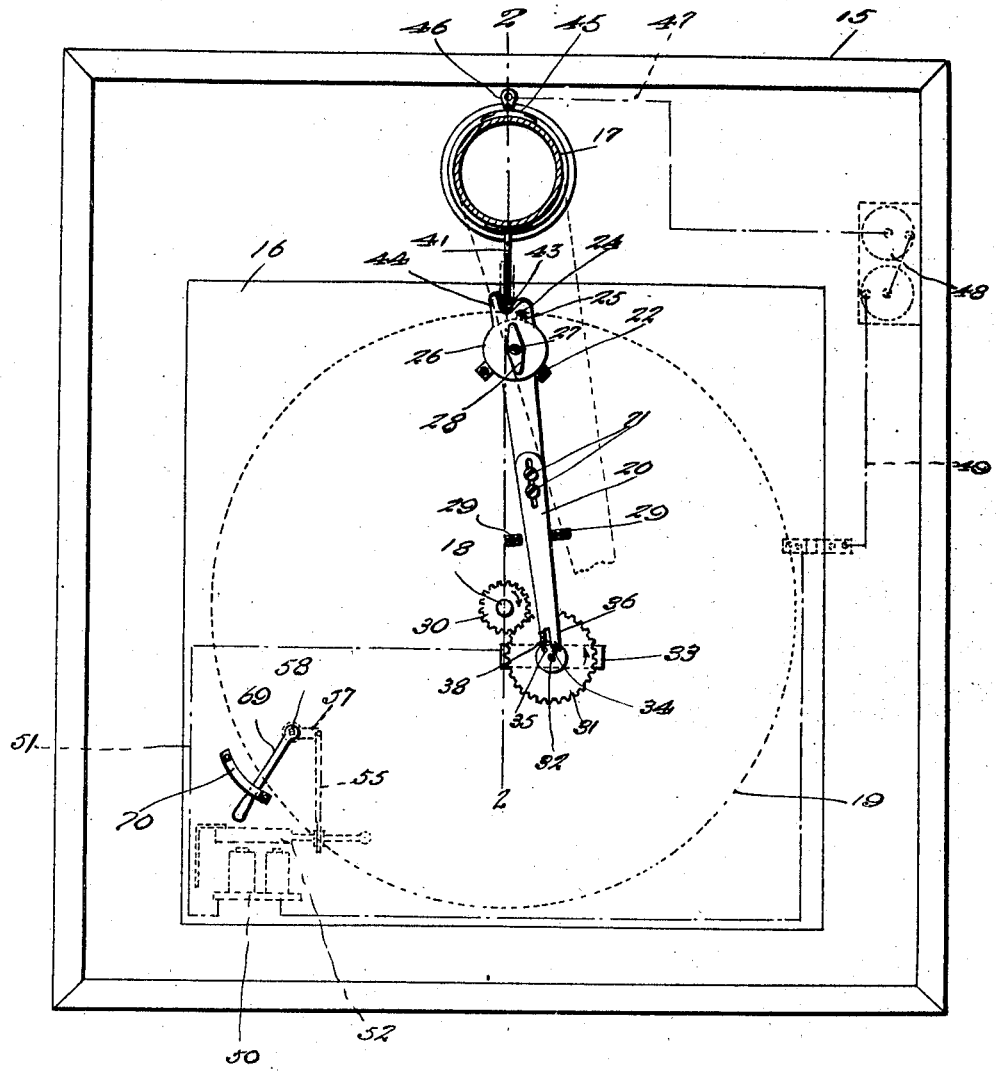
Figure 1 is a plan view of a phonograph with the invention applied thereto and a turn table shown by dotted lines, the electrical devices and circuits which are included in the invention, being illustrated in diagram.
Figure 3:
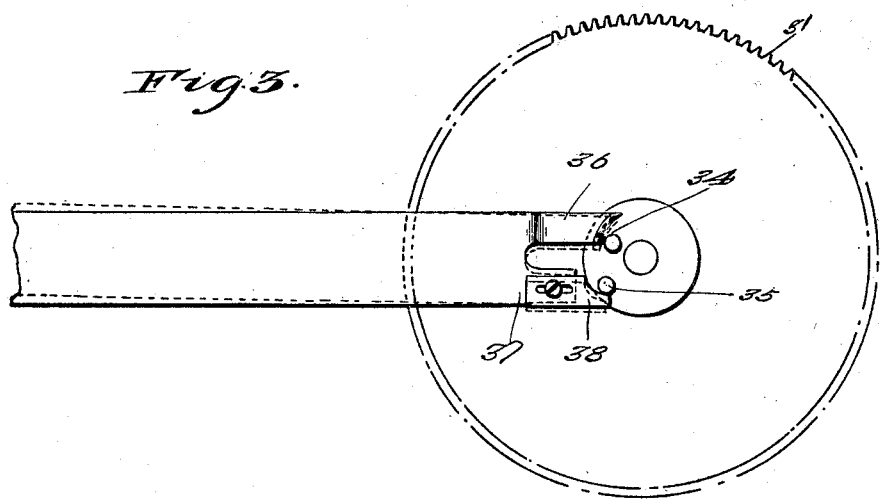
Figure 3 is an enlarged plan view showing the outer end of the connecting arm and illustrating by full and dotted lines different positions of this arm.
Figure 2:
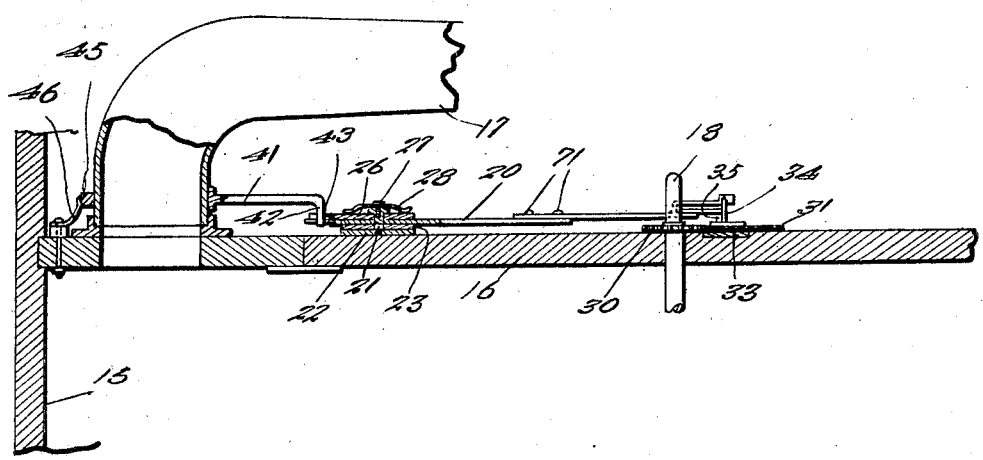
Figure 2 is an enlarged sectional view on the line 2—2 of Figure 1.

Referring in detail to the drawings, wherein like characters of reference denote corresponding parts, the reference character 15 indicates a phonograph cabinet, 16, the motor board, 17 the tone arm, 18 the turn table shaft and 19 the turn table, all of which may be of the usual or any preferred construction.

The invention, which may be used in connection with any talking machine playing disc records, includes an arm 20 which is pivotally mounted as indicated at 21 between the turn table 19 and the motor board 16, the pivot 21 being carried by a stand or bracket 22 secured to the top of the motor board 16. Also mounted upon the pivot 21 below the arm 20 is a disc or plate 23, which is provided at its periphery with an upwardly extending finger 24, the latter being adapted to enter an opening 25 which is provided in a superimposed plate or disc 26, also mounted upon the pivot 21. Secured to the top of the pivot 21 by means of a screw 27, is a tensioning spring 28, the opposite ends of the latter engaging the upper face of the disc 26 so as to provide frictional engagement between the discs 23 and 26 and the inner end of the arm 20 and frictionally hold the latter against pivotal movement. Pivotal movement of the arm 20 is limited by means of adjustable stops 29 which are located upon opposite sides of the arm in the path of movement of the latter.

Secured upon the turn table shaft 18 is a pinion 30, which engages and drives a gear 31. This gear is mounted for rotary movement upon a stud or shaft 32, secured to a standard or bracket 33, the latter being mounted upon the motor board 16. The hub of the gear 31 is provided with spaced pins 34 and 35, the former being of greater length than the latter, so that the upper end of the pin 34 will extend above the upper end of the pin 35. The outer end of the arm 20 is bifurcated to provide spaced fingers 36 and 37 and adjustably secured to this last mentioned finger is a trip 38 which is located in the path of movement of the pin 35, which pin is spaced a slightly greater distance from the center of the hub of the gear 31, than the pin 34. The finger 36 of the arm 20 is provided with an upwardly and outwardly extending portion 39, having a curved or arcuate extremity 40 which is spaced above the plane of the arm 20 and adapted to be engaged by the upper end of the pin 34 during rotation of the gear 31.

Secured to the tone arm 17 and extending below the horizontal portion of this arm is an operating lever 41, having a downwardly turned extremity or finger 42. This finger is adapted to enter a notch 43 formed in the disc 26 and to engage a lug 44 extending to one side of this notch. Thus, when the tone arm is moved inwardly toward the center of a record sufficiently for the finger 42 to engage the lug 44, the latter will be moved upon the pivot 21 and through frictional engagement between the discs 23, 26 and the inner end of the arm 20, the latter will be pivotally moved in an opposite direction until it engages one of the stops 29.

The tone arm 17 carries a contact plate 45 and located in the path of movement of this plate is a spring arm or contact 46, which is connected by means of a conductor 47 with a battery 48. This battery is in turn connected by a conductor 49 with an electromagnet 50, and the latter is connected by means of a conductor 51 to one arm of the standard 33 which carries the stud or shaft 32 of the gear 31. When the magnet 50 is energized, it will attract an armature 52, the latter being provided with a weighted arm 53 which extends through an elongated slot 54 formed in one end of a rod 55. The opposite end of this rod is pivotally connected as at 56 with an arm 57 extending from a rock shaft 58. This shaft 58 has bearings in the frame 59 of the talking machine motor and extends upwardly through the motor board 16, where it is provided with a squared end 60. The rock shaft 58 is also provided with a lug 61 which is adapted to be engaged by an arm 62 which extends from one end of a brake arm 63. This brake arm is pivotally mounted as at 64 and is provided at one end with a lug 65 which is adapted to frictionally engage a disc 66 which is rotatable with a governor 67 of the talking machine motor. The brake arm 63 is urged to engage the disc 66 by means of a spring 68 and is held from such engagement when the lug 61 is in the path of movement of the arm 62.

Thus, when the magnet 50 is energized in a manner to be hereinafter explained, the weighted arm 53 of the arm 52, will, through the medium of the rod 55 and arm 57, rock the shaft 58 so as to move the lug 61 out of the path of the arm 62. When this occurs, the spring 68 will force the lug 65 into frictional engagement with the disk 66 of the governor 67 so as to stop the operation of the machine motor. This operation may be manually accomplished through the medium of a hand lever 69 which is secured upon the squared end 60 of the shaft 58 and which is movable beneath a guide segment 70. The hand lever 69 may be operated to rock the shaft 58 so as to move the lug 61 out of the path of the arm 62, without affecting the armature 52, due to the slotted connection 54 between the rod 55 and the said armature.

The arm 20 is preferably formed in sections which are connected together as shown at 71, so that the said arm may be accurately adjusted for contact by the pins 34 and 35.

In Figure 10 there is illustrated a diagrammatic view of a disc record, wherein the dotted line 74 represents the stopping zone, or the zone within which a selection will end.

In the operation of the invention, the tone arm will be positioned adjacent the outer periphery of the record within one of the grooves of greatest diameter, in the ordinary manner. As soon as the turn table shaft 18 begins to rotate the record, the pins 34 and 35 which are carried by the hub of the gear 31 will also rotate about the stud 32, causing the pin 35 to engage the trip 38 to move the arm 20 to the left in Figure 1. This brings the finger 36 (that is the segmental portion 40 of said finger) in the path of the pin 34 so that the latter wipes against this segmental portion. As the pin 34 and the arm 20 are in an electric circuit with the magnet 50, a circuit closer is provided. The circuit through the magnet however is not closed due to the position of the tone arm 17, as the latter has not moved inward a sufficient distance against the contacts 45 and 46 to engage. As soon as the stylus or needle however reaches the zone between the dotted lines 73 and 74 of the record, the finger 42 will engage the lug 44 of the friction disc 26 so as to move the arm 20 pivotally. The outer end of this arm will thus be swung in an opposite direction, or in a direction away from the path of movement of the pin 34 so that the latter will pass the finger 36 without making contact and the circuit will still be open. When the stylus reaches its limit of inward movement within the zone between the dotted lines 73 and 74, pivotal movement of the arm 20 due to engagement between the finger 42 and the lug 44 will cease, so that when the pin 35 again engages the trip 38, the arm 20 will again be moved toward the left in Figure 1 so as to bring the segmental portion 40 again in the path of the pin 34 and as soon as this pin engages the arm 20, an electric circuit through the magnet 50 will be completed so that the latter will be energized to attract the armature 52. When this occurs, the rock shaft 58 will be pivotally moved through the connection of the rod 55 and the arm 57 so as to move the lug 61 out of engagement with the arm 62, whereupon the spring 68 will draw the pivoted lever 63 against the disc 66 of the governor 67 and stop the operation of the machine.

The invention is susceptible of various changes in its form, proportions and minor details of construction and the right is herein reserved to make such changes as properly fall within the scope of the appended claims.

Having described the invention what is claimed is:—

1. The combination with a sound reproducing machine including a disc record, a brake for holding the record against movement and a tone arm movable over the record, of a circuit closer including a pivotally mounted arm, means controlled by the operation of the machine for controlling the operation of the circuit closer and means also controlled by the operation of the machine for rendering the circuit closer inactive until the tone arm reaches a predetermined inward limit of movement.

2. The combination with a sound reproducing machine including a disc record, a brake for holding the record against movement and a tone arm movable over the record, of a circuit closer including a pivotally mounted arm, means controlled by the operation of the machine for controlling the operation of the circuit closer and means including a tone arm carried lever engageable with the pivotally mounted arm for rendering the circuit closer inactive until a predetermined tone arm reaches its inward limit of movement.

3. The combination with a sound reproducing machine including a disc record, a brake for holding the record against movement and a tone arm movable over the record, of a pivotally mounted contact member, a rotatable contact member, means whereby operation of the machine will cause an intermittent engagement of the contact members, a tone arm controlled circuit closer and means whereby the circuit closer will be closed and the contact members engaged when the tone arm reaches the limit of inward movement.

4. The combination with a sound reproducing machine including a disc record, a brake for holding the record against movement and a tone arm movable over the record, of a pivotally mounted contact member, a rotatable contact member, means whereby operation of the machine will cause an intermittent engagement of the contact members, a tone arm controlled circuit closer and means including a tone arm carried member engageable with the pivotally mounted arm, whereby the circuit closer will be closed and the contact members engaged when the tone arm reaches the limit of inward movement.

5. The combination with a sound reproducing machine including a disc record, a brake for holding the record against movement, and a tone arm movable over the record, of a plurality of circuit closers, means controlled by the operation of the machine for operating the circuit closers and means whereby the circuit closers will be simultaneously engaged only when the tone arm reaches a predetermined limit of inward movement.

In testimony whereof I affix my signature.

RICHARD W. STEWART.